United States Patent [19]
Klosterhaus

[11] Patent Number: 5,851,015
[45] Date of Patent: Dec. 22, 1998

[54] RACK AND PINION STEERING SYSTEM FOR FOUR WHEEL DRIVE VEHICLE

[75] Inventor: Edwin G. Klosterhaus, Livonia, Mich.

[73] Assignee: TRW Inc., Lyndhurst, Ohio

[21] Appl. No.: 823,000

[22] Filed: Mar. 21, 1997

[51] Int. Cl.⁶ ................................................. B62D 7/16
[52] U.S. Cl. ............................... 280/93.51; 280/93.511; 280/93.514; 180/437
[58] Field of Search ............................ 280/846, 771, 280/93.502, 93.507, 93.51, 93.511, 93.514; 180/434, 440, 436, 437, 439

[56] References Cited

U.S. PATENT DOCUMENTS

| | | | |
|---|---|---|---|
| 1,905,513 | 4/1933 | Shay | 280/95.1 |
| 3,456,752 | 7/1969 | Fonda | 180/437 |
| 4,364,578 | 12/1982 | Ikeda et al. | 280/95.1 |
| 4,522,419 | 6/1985 | Yoshida et al. | 280/96 |
| 4,802,546 | 2/1989 | Sakikawa et al. | 180/132 |

*Primary Examiner*—Paul N. Dickson
*Attorney, Agent, or Firm*—Tarolli, Sundheim, Covell, Tummino & Szabo

[57] ABSTRACT

A steering system (10) for a four wheel drive, live axle vehicle (12) includes a rack and pinion steering gear assembly (80) including an elongate rack (100) having a longitudinal axis (102) and extending axially through a rack housing (82). The rack (100) is movable axially in the rack housing (82) in response to rotation of the vehicle steering wheel (104). A first end portion (108) of the rack (100) projects axially from the rack housing (82). A drag link (60) is connected between the first end portion of the rack and one of the first and second steering arms (40, 44) for transmitting steering force to the one (40) of the first and second steering arms. The drag link (60) is pivotally connected with the rack (100) at a location (130) on the rack axis (102). The drag link (60) has a kinematic axis (68) which extends generally parallel to the rack axis (102).

10 Claims, 2 Drawing Sheets

RACK AND PINION STEERING SYSTEM FOR FOUR WHEEL DRIVE VEHICLE

BACKGROUND OF THE INVENTION

Many four wheel drive vehicles have front beam, or live, front axle assemblies which include a differential gear housing integral with the axle assembly. The front axle assembly extends laterally along a drive axis between the left front and right front wheels of the vehicle. A drive shaft extends rearward from the differential gear housing to the vehicle power source. The differential transmits rotational force from the drive shaft to the front wheels to drive the front wheels for rotation to effect forward and rearward movement of the vehicle along the ground. The differential gear housing typically extends both forward and rearward about 6" from the drive axis.

The front wheels of the vehicle are steerable. A steering knuckle is associated with each steerable wheel of the vehicle. Each steering knuckle includes a steering arm which extends forward from the drive axis (the axis of rotation of the wheel). A pivot joint on the end of the steering arm receives steering force from steering linkage, such as a cross link and/or tie rods. Steering force, transmitted through the steering linkage to the steering arms, effects steering movement of the steerable wheels to steer the vehicle.

A steering linkage axis is defined between the pivot joints of the steering arms. In order to limit steering wheel rotation to about three full turns lock-to-lock, the steering arms can, in practice, extend forward from the steering linkage axis by no more than about 6".

Steering force is provided by a steering unit controlled by rotation of the vehicle steering wheel. Known types of steering units include recirculating ball-nut, worm-and-roller, and rack and pinion steering units. Rack and pinion steering units are generally desirable in vehicle applications because they are lighter in weight, less costly, and can provide more steering precision and better steering feel than recirculating ball-nut or worm-and-roller steering units.

The steering linkage must be configured so that when the vehicle turns, a proper relationship between the relative steer angles of the inside and outside wheels is maintained to minimize scuffing, or undesirable tire movement not in the rolling direction of the tire. This relationship is called Ackerman steering.

Known steering linkage exists for use with this type of live front axle vehicle to provide acceptable Ackerman steering. Typical known steering linkage for use with this type of live front axle vehicle includes a pitman arm which rotates from the steering gearbox; a drag link connected between the pitman arm and the far side steering knuckle; and either (a) a Haltenberger link connected between the near side steering knuckle and an intermediate point on the drag link, or (b) a cross link connected between the two steering knuckles.

An important factor affecting the design and geometry of a vehicle rack and pinion steering system is the need to minimize side loading (bending moment) of the rack. Rack and pinion steering gear assembly units are, by design, capable of resisting, internally, side forces of nominal magnitude. However, side forces or moments capable of causing elastic bending deformation of the rack may cause binding. It is good steering design practice to minimize, within other constraints, side forces and moments on the steering rack ends.

In a conventional installation of a rack and pinion steering gear assembly in a vehicle not including a live front axle, the rack and pinion steering gear assembly is connected generally along or parallel to the steering linkage axis, directly between the left and right steering arms. Tie rods pivotally attached at opposite ends of the rack are connected at their outer ends to the steering arms. With this positioning of the rack and pinion steering gear assembly, force applied to the rack, by the steering linkage, acts essentially along the steering axis, and there is minimal side loading on the rack.

Such a placement is not possible in a four wheel drive vehicle with a live front axle as described above, because physical interference would occur between the rack and pinion steering gear assembly and the differential gear housing. Specifically, the differential gear housing projects forward of the drive axis by a distance which is great enough to interfere, physically, with a rack and pinion steering gear assembly which would be located on the steering linkage axis.

This interference problem can not be solved simply by moving the rack and pinion steering gear assembly and the tie rods far enough forward in the vehicle to clear the differential gear housing. Were this done, acceptable Ackerman steering would no longer result, and unacceptable amounts of side loading of the rack could also occur.

Another important factor in determining configuration of the steering gear assembly and linkage is bump steer. To minimize bump steer of a wheel of a live axle vehicle, the steering linkage elements to which its steering arm is attached should be as long as possible, ideally extending substantially all the way across to the opposite side wheel. This minimizes the angle through which the steering arm turns as the wheel moves up and down over the road surface relative to the vehicle body.

The known steering linkage of the types described above has acceptable geometry regarding the factors of Ackerman steering and bump steer. This known steering linkage, however, has required the use of a recirculating ball-nut steering gear, or a worm-and-roller steering gear, located off the steering axis. A rack and pinion steering gear assembly has not been used in this type of vehicle because, among other reasons, the linkage geometry produces unacceptably high side loading of the rack.

SUMMARY OF THE INVENTION

The present invention is an apparatus for effecting steering movement of first and second steerable drive wheels of a vehicle in response to rotation of a steering wheel of the vehicle. The vehicle is of the type including a drive axle assembly interconnecting the first and second steerable wheels of the vehicle and a drive shaft extending rearward in the vehicle from the drive axle assembly. The drive axle assembly includes a differential gear housing containing gears for transmitting rotational force from the drive shaft to the steerable wheels to drive the steerable wheels for rotation about a drive axis extending along the drive axle assembly. The vehicle includes first and second steering arms associated with the first and second steerable wheels, respectively, for receiving steering force for effecting turning movement of the first and second steerable wheels. The vehicle has a steering linkage axis extending between the first and second steering arms.

The apparatus for effecting steering movement comprises a rack and pinion steering gear assembly including an elongate rack having a longitudinal axis and extending axially through a rack housing. The rack is movable axially in the rack housing in response to rotation of the vehicle steering wheel. A first end portion of the rack projects axially from the rack housing. A drag link is connected between the first end portion of the rack and one of the first and second steering arms for transmitting steering force to the one of the first and second steering arms.

In the preferred embodiment, the drag link is pivotally connected with the rack at a location on the rack axis. The drag link has a kinematic axis which extends generally parallel to the rack axis.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE PREFERRED EMBODIMENTS

Figure 1:
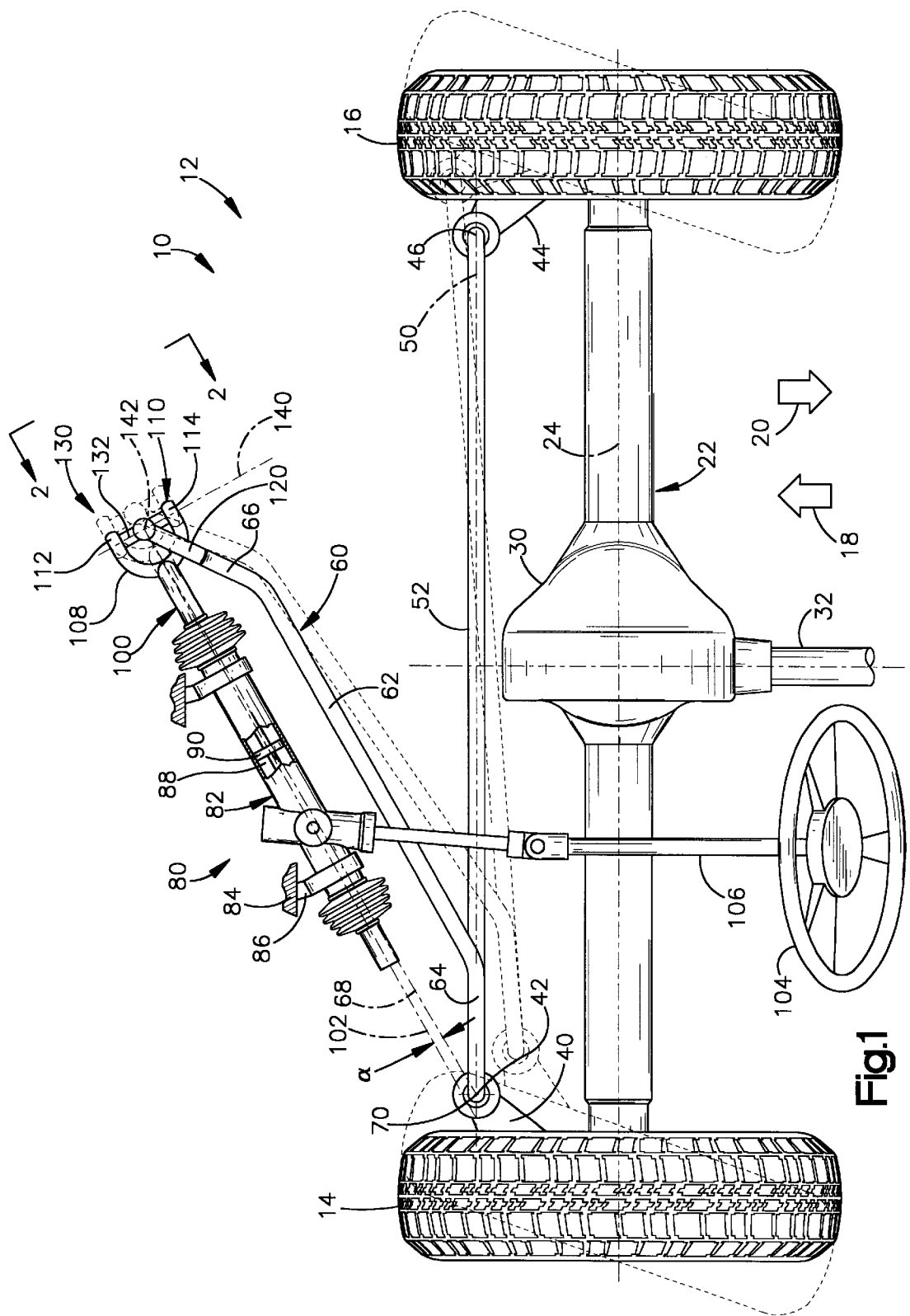
FIG. 1 is a schematic illustration of a rack and pinion steering system for a four wheel drive vehicle, constructed in accordance with the present invention.

The present invention relates to a rack and pinion steering system for a four wheel drive vehicle. As representative of the present invention, FIG. 1 illustrates schematically a steering system 10 for a vehicle 12.

The vehicle 12, only a portion of which is shown, is a four wheel drive vehicle having left and right front wheels 14 and 16. A forward direction in the vehicle 12 is indicated by the arrow 18. A rearward direction in the vehicle 12 is indicated by the arrow 20.

The front axle assembly 22 of the vehicle 12 is a drive axle in the form of a solid beam axle, or live axle. The front axle 22 extends laterally along a drive axis 24 between the left front and right front wheels 14 and 16 of the vehicle 12. The axle assembly 22 includes a differential gear housing 30. A drive shaft 32 extends rearward in the vehicle 12 from the differential gear housing 30 to the power source (not shown) of the vehicle, such as the vehicle transmission.

The differential gear housing 30 encloses a differential (not shown) including a ring gear typically having a diameter of about 10 inches. The differential transmits rotational force from the drive shaft 32 to the front wheels 14 and 16 to drive the front wheels for rotation to effect forward and rearward movement of the vehicle 12 along the ground. The differential gear housing 30 projects about 5" to about 6" or more forward of the drive axis 24.

The front wheels 14 and 16 of the vehicle 12 are steerable. A left steering arm 40 is associated with the left steerable wheel 14 of the vehicle 12 as part of a left steering knuckle. The left steering arm 40 has a pivot connection 42 in the form of a ball joint. The pivot connection 42 is disposed on the left steering arm 40 about 6" forward of the drive axis 24.

A right steering arm 44 is associated with the right steerable wheel 16 of the vehicle 12 as part of a right steering knuckle. The right steering arm 44 has a pivot connection 46 in the form of a ball joint. The pivot connection 46 is disposed on the right steering arm 44 about 6" forward of the drive axis 24.

A steering linkage axis 50 is defined between the pivot connections 42 and 46 of the steering arms 40 and 44.

Known steering pivots (not shown) connect the drive axle assembly 22 with the steerable wheels 14 and 16.

The steering system 10 includes a cross link 52 which extends between and interconnects the left and right steering arms 40 and 44. The cross link 52 is a solid rod connected between the pivot connections 42 and 46, along the steering linkage axis 50. The steering linkage axis 50 is either disposed far enough forward in the vehicle 12, or bent or otherwise shaped, so that the cross link 52 clears, that is, does not physically interfere with, the differential gear housing 30. The cross link 52 extends for substantially the entire distance between the first and second steerable wheels 14 and 16 of the vehicle 12. The cross link 52 extends across the vehicle centerline 54.

The steering system 10 includes a drag link 60 which is connected with the cross link 52. The drag link 60 has a non-linear configuration to clear the steering gear assembly 80. In the particular embodiment illustrated in the drawings, the drag link 60 has a generally U-shaped configuration as seen in FIG. 1 including a linear central portion 62. A linear first end portion 64 of the drag link 60 extends at an angle of about 30° to the central portion 62. A linear second end portion 66 of the drag link 60 extends at an angle of about 30° to the central portion 62. The second end portion 66 of the drag link 60, as illustrated, is a mirror image of the first end portion 64 of the drag link 60. It should be understood that other configurations or angles can be used, and the two end portions need not be identical, so long as the drag link 60 clears the structure and operating envelope of the steering gear assembly.

The drag link 60 has a kinematic axis designated in FIG. 1 by the reference numeral 68. The kinematic axis 68 is the imaginary line of force transmission between the pivot connections at the ends of the drag link 60. The kinematic axis 68 of the drag link 60 extends generally parallel to the central portion 62 of the drag link 60.

The first end portion 64 of the drag link 60 is connected to a second pivot connection 70 on the left steering arm 40. The second pivot connection 70 is typically a second ball joint spaced apart a small distance from the other pivot connection 42 on the left steering arm 40. For clarity, the two pivot connections 70 and 42 on the left steering arm 40 are illustrated in FIG. 1 as being at the same location.

The drag link 60 extends for a large portion of the distance between the first and second steerable wheels 14 and 16 of the vehicle 12. The drag link 60 extends across the vehicle centerline 54.

Steering force applied to the drag link 60, in a manner described below, is transmitted through the second pivot connection 70 to the left steering arm 40 and thence to the pivot connection 42. The cross link 52 transmits steering force from the left steering arm 40 to the right steering arm 44. This steering force effects steering movement of the steerable wheels 14 and 16 to steer the vehicle 12.

Steering force for the steering system 10 is provided by a rack and pinion steering gear assembly 80. In the illustrated embodiment, the steering gear assembly 80 is a hydraulic power assist unit. It should be understood that a manual unit or an electrically powered unit could, alternatively, be used.

The steering gear assembly 80 is generally of a known construction and includes a rack housing 82 secured to the vehicle body 84 by mounting means indicated schematically at 86. The rack housing 82 defines a cylinder 88. A piston 90 is disposed in the cylinder 88.

The piston 90 is fixed for movement with an elongate rack 100 along a longitudinal axis 102 of the rack. The rack axis 102 is neither parallel to nor in close proximity to the steering linkage axis 50. The rack axis 102 is located in the vehicle 12 forward of the steering linkage axis 50.

Rack teeth (not shown) on the rack 100 are in meshing engagement with a pinion (not shown) supported for rotation in the rack housing 82. The pinion is rotatable in the rack housing 82 upon rotation of a handwheel or steering wheel 104 of the vehicle 12. Rotational force is transmitted from the steering wheel 104 to the pinion by a steering shaft assembly 106.

The rack and pinion steering gear assembly 80 is a single end takeoff assembly. A first end portion 108 of the rack 100 projects from the right end of the rack housing 82. A clevis 110 is formed on the first end portion 108 of the rack 100. The clevis 110 on the rack 100 has first and second arm portions 112 and 114.

A second end portion of the drag link 60 is formed as a clevis 120. The clevis 120 on the drag link 60 has first and second arm portions 122 and 124. The clevis 120 on the drag link 60 is connected with the clevis 110 of the rack 100 to form a Hooke joint, or universal joint, 130. The drag link 60 extends rearward and laterally in the vehicle 12 from the Hooke joint 130.

The Hooke joint 130 includes an X-shaped cross or spider 132 which extends between and interconnects the clevis 110 on the rack 100 and the clevis 120 on the drag link 60. A first arm 134 of the spider 132, with bearings on its ends, extends between the arm portions 112 and 114 of the rack clevis 110. A second arm 136 of the spider 132, with bearings on its ends, extends between the arm portions 112 and 124 of the drag link clevis 120.

The Hooke joint connection between the rack 100 and the drag link 60 enables pivotal movement of the drag link 60 relative to the rack about a first axis of movement 140. The first axis of movement 140 extends along the first arm 134 of the spider 132, that is, between the arm portions 112 and 114 of the rack clevis 110.

The Hooke joint connection also enables pivotal movement of the drag link 60 relative to the rack 100 about a second axis of movement 142. The second axis of movement 142 extends along the second arm 136 of the spider, that is, between the arm portions 122 and 124 of the drag link clevis 120. These two degrees of movement are sufficient to allow the needed movement of the various parts of the steering system 10 during operation of the vehicle 12.

The illustrated rack and pinion steering gear assembly 80, which is a hydraulic power assist unit, also includes a control valve (not shown) for controlling fluid flow, in a known manner, between a power steering pump (not shown) and the cylinder 88. When the vehicle steering wheel 104 is rotated, the control valve directs fluid under pressure into the cylinder 88 to effect axial movement of the piston 90 and, thereby, of the rack 100. This axial movement of the rack 100 provides steering force at the first end portion 108 of the rack. This steering force is transmitted through the drag link 60 to the left steering arm 40 and, through the cross link 52, to the right steering arm 44. The axial movement of the rack 100 also results in rotation of the pinion in a known follow-up manner, to return the control valve to a neutral or centered condition.

The rack and pinion steering gear assembly 10 shown in FIG. 1 applies steering force to the drag link 60 in a direction substantially parallel to the kinematic axis 68 of the drag link. The steering system 10 has acceptable Ackerman steering and bump steer characteristics, even though the rack axis 102 is neither parallel to nor in close proximity to the steering linkage axis 50. Also, side loading of the rack 100 is reduced to acceptable levels, so as to enable use of a rack and pinion steering gear assembly in a four wheel drive, live axle vehicle as described.

Specifically, the side loading, or bending moment, on the rack 100 has two components. The first force component of the side loading relates from the angle "$\alpha$" (FIG. 1) between the rack axis 102 and the kinematic axis 68 of the drag link 60. The magnitude of this first force component is proportional to the angle "$\alpha$". It is, therefore, desirable to minimize the angle "$\alpha$" so as to minimize this force component.

In the present invention, this angle "$\alpha$" is minimized by orienting the rack axis 102 as close to parallel as possible to the kinematic axis 68 of the drag link 60, without producing physical interference between the rack 100 and the drag link.

This is accomplished by the non-linear (as illustrated, U-shaped) configuration of the drag link 60. This configuration enables the drag link 60 to physically clear the steering gear assembly 80 while still orienting the kinematic axis 68 of the drag link substantially parallel to the rack axis 102. This minimizes or eliminates the angle $\alpha$ between the rack axis 102 and the drag link kinematic axis 68, at least in the static installed position. This orientation can not be maintained at all times during operation of the vehicle 12, because the drag link 60 moves relative to the fixed steering gear assembly 80; but it can be optimized in practice to an acceptable condition. Specifically, the angle "$\alpha$" between the rack axis 102 and the kinematic axis 68 of the drag link 60 varies, during movement of the drag link relative to the rack 100, in a range of from about 0° to about 5°. This range is small enough to limit side loading of the rack 100 to an acceptable amount.

The second force component of side loading relates to the offset distance "$\beta$" (not shown), that is, the distance between the rack axis 102 and the pivot connection between the rack 100 and the drag link 60, as measured in a direction perpendicular to the rack axis. Steering force is transmitted to and from the rack 100 through this pivot connection (in the illustrated embodiment, the Hooke joint 130). If "$\beta$" is non-zero, a bending moment is generated on the rack 100.

In the present invention, the pivot connection between the drag link 60 and the rack 100, that is, the Hooke joint 130, is located on the rack axis 102. This placement puts one end of the kinematic axis 68 of the drag link 60 on the rack axis 102. This eliminates any "$\beta$" offset, and so the magnitude of this second force component of the rack side loading is zero.

Because the drag link 60 of the present invention is not linear, the center of mass of the drag link is not located on the kinematic axis 68 of the drag link. This tends to urge the drag link 60 to rotate about its end points under the influence of gravity, that is, to sag or drop downward relative to the other parts of the steering system 10. To counter this, the Hooke joint 130 is configured to enable relative movement between the drag link 60 and the rack 100 as needed for steering and suspension movement, while preventing the drag link from rotating about the rack axis 102 and dropping as a result. Specifically, the inherent resistance to rotation of the rack 100, about the rack axis 102, blocks rotational movement of the drag link 60 about the rack axis. This prevents the drag link 60 from dropping downward relative to the other parts of the steering system 10.

Figure 2:
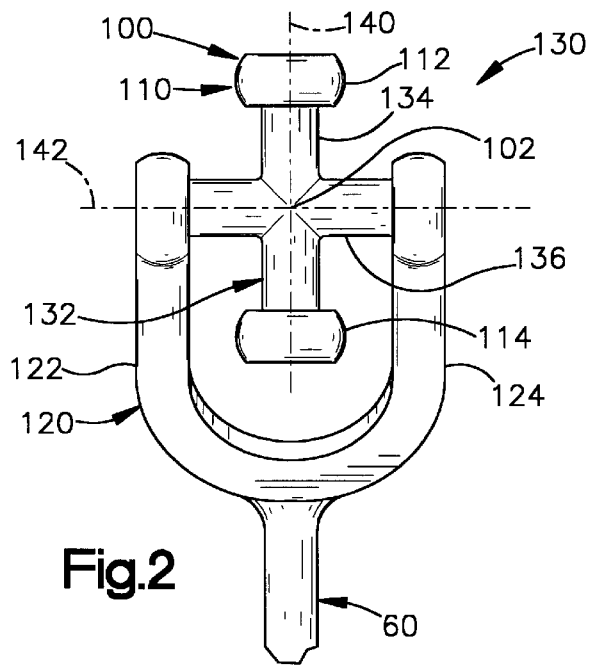
FIG. 2 is an enlarged view of a pivot connection which is part of the steering system of FIG. 1.
Figure 3:
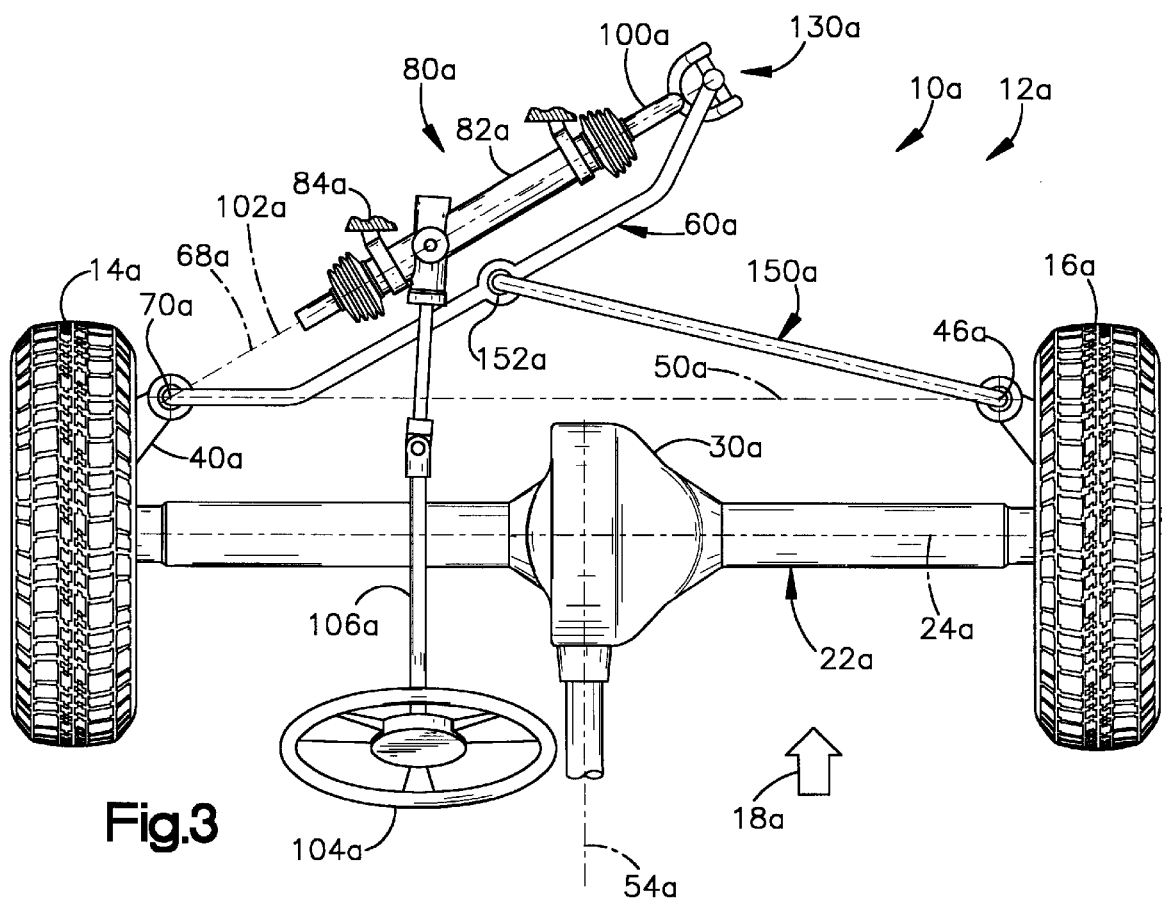
FIG. 3 is a view similar to FIG. 1 of a rack and pinion steering system constructed in accordance with a second embodiment of the present invention.

FIG. 3 illustrates a steering system 10a constructed in accordance with a second embodiment of the present invention. The steering system 10a is generally similar to the steering system 10 (FIGS. 1–2), and similar or identical parts are given the same reference numeral with the suffix "a" added to distinguish.

In the steering system 10a, the cross link 52 (FIG. 1) is replaced by a Haltenberger link 150 (FIG. 3). The Haltenberger link 150 is attached at its outboard end to the right steering arm 44a. The inboard end of the Haltenberger link 150 is attached at a pivot connection 152 to the drag link 60.

The connection 152 of the Haltenberger link 150 to the drag link 60a is at a point which is spaced apart from the Hooke joint 130a as much as feasible. As a result, the Haltenberger link 150 extends across the vehicle centerline 54a. The Haltenberger link 150 extends for a substantial portion of the distance between the first and second steerable wheels 14a and 16a of the vehicle 12a.

Steering force applied to the drag link 60a, in the manner described above, is transmitted by the drag link 60a to the left steering arm 40a. The Haltenberger link 150 transmits steering force from the drag link 60a to the right steering arm 44a. The steering force effects steering movement of the steerable wheels 14a and 16a to steer the vehicle 12a.

The rack and pinion steering gear assembly 80a in the steering system 10a is mounted to the vehicle 12a in the same location as in the steering system 10. The drag link 60a is similar to the drag link 60a with the exception of the intermediate pivot connection 152 to the Haltenberger link 150. As a result, the steering system 10a has acceptable Ackerman steering and bump steer characteristics, as well as acceptably low side loading of the rack 100a.

It should also be noted that in the rack and pinion steering assembly 80a in the steering system 10a, the rack axis 102a is collinear with the kinematic axis 68a of the drag link 60a. The angle "α" is 0°. As a result, side loading of the rack 100a, due to angular displacement between the rack axis 102a and the kinematic axis 68a of the drag link 60a, is eliminated (at least when the parts are in the illustrated position; as discussed above, the angle "α" between the rack axis and the kinematic axis of the drag link varies, during movement of the drag link relative to the rack).

From the above description of the invention, those skilled in the art will perceive improvements, changes and modifications. For example, the present invention is applicable to manual steering systems as well as to power assist steering systems. Such improvements, changes and modifications within the skill of the art are intended to be covered by the appended claims.

Having described the invention, I claim:

1. An apparatus comprising:
   first and second steerable drive wheels of a vehicle;
   an axle assembly interconnecting said first and second steerable wheels of the vehicle;
   first and second steering arms associated with said first and second steering wheels, respectively, for receiving steering force for effecting turning movement of said first and second steerable wheels, a steering linkage axis extending between said first and second steering arms;
   a rack and pinion steering gear assembly including an elongate rack having a longitudinal axis and extending axially through a rack housing, said rack being movable axially in said housing, a first end portion of said rack projecting axially from said rack housing;
   a drag link structurally connected between said first end portion of said rack and one of said first and second steering arms for transmitting steering force to said one steering arm;
   a second steering link for transmitting steering force from said drag link to the other one of said first and second steering arms; and
   a Hooke joint interconnecting said drag link and said first end portion of said rack.

2. An apparatus as defined in claim 1 wherein said Hooke joint blocks rotational movement of said drag link about said rack axis.

3. An apparatus comprising:
   first and second steerable drive wheels of a vehicle;
   a drive axle assembly interconnecting said first and second steerable wheels and a drive shaft extending from the drive axle assembly, the drive axle assembly including a differential gear housing containing gears for transmitting rotational force from the drive shaft to the steerable wheels to drive the steerable wheels for rotation about a drive axis extending along the drive axle assembly;
   first and second steering arms associated with said first and second steerable wheels, respectively, for receiving steering force for effecting turning movement of said first and second steerable wheels, a steering linkage axis extending between said first and second steering arms;
   a rack and pinion steering gear assembly including an elongate rack having a longitudinal axis and extending axially through a rack housing, said rack being movable axially in said rack housing, a first end portion of said rack projecting axially from said rack housing;
   a drag link structurally connected between said first end portion of said rack and one of said first and second steering arms for transmitting steering force to said one steering arm; and
   a second steering link for transmitting steering force from said drag link to the other one of said first and second steering arms;
   said drag link having a kinematic axis which extends generally parallel to said rack axis;
   said drag link having a non-linear configuration to clear said steering gear assembly and its operating envelope.

4. An apparatus as set forth in claim 3 wherein said drag link has a kinematic axis which is substantially collinear with said rack axis.

5. An apparatus as set forth in claim 4 wherein the angle between said rack axis and the kinematic axis of said drag link varies, during movement of said drag link relative to said rack, in a range of from about 0° to about 5°.

6. An apparatus as set forth in claim 3 wherein said rack axis is not parallel to the steering linkage axis.

7. An apparatus as set forth in claim 3 wherein the differential gear housing extends in the range of from about 5" to about 6" forward of the drive axis, the steering linkage axis is located forward of the differential gear housing, and said rack axis is located forward of the steering linkage axis.

8. An apparatus comprising:
   first and second steerable drive wheels of a vehicle;
   a drive axle assembly interconnecting said first and second steerable wheels and a drive shaft extending from the drive axle assembly, the drive axle assembly including a differential gear housing containing gears for transmitting rotational force from the drive shaft to the steerable wheels to drive the steerable wheels for rotation about a drive axis extending along the drive axle assembly;
   first and second steering arms associated with said first and second steerable wheels, respectively, for receiving steering force for effecting turning movement of said first and second steerable wheels, a steering linkage axis extending between said first and second steering arms;

a rack and pinion steering gear assembly including an elongate rack having a longitudinal axis and extending axially through a rack housing, said rack being movable axially in said rack housing in response to rotation of the vehicle steering wheel, a first end portion of said rack projecting axially from said rack housing;

a drag link structurally connected between said first end portion of said rack and one of said first and second steering arms for transmitting steering force to said one steering arm;

a second steering link for transmitting steering force from said drag link to the other one of said first and second steering arms; and a pivot connection interconnecting said drag link with said rack at a location on said rack axis;

said drag link extending from said pivot connection toward said one of said first and second steering arms.

9. An apparatus comprising:

first and second steerable drive wheels of a vehicle;

a drive axle assembly interconnecting said first and second steerable wheels and a drive shaft extending from the drive axle assembly, the drive axle assembly including a differential gear housing containing gears for transmitting rotational force from the drive shaft to the steerable wheels to drive the steerable wheels for rotation about a drive axis extending along the drive axle assembly;

first and second steering arms associated with said first and second steerable wheels, respectively, for receiving steering force for effecting turning movement of said first and second steerable wheels, a steering linkage axis extending between said first and second steering arms;

a rack and pinion steering gear assembly including an elongate rack having a longitudinal axis and extending axially through a rack housing, said rack being movable axially in said rack housing, a first end portion of said rack projecting axially from said rack housing;

a drag link structurally connected between said first end portion of said rack and one of said first and second steering arms for transmitting steering force to said one steering arm;

a second steering link for transmitting steering force from said drag link to the other one of said first and second steering arms; and a Hooke joint interconnecting said drag link and said first end portion of said rack.

10. An apparatus as set forth in claim 9 wherein said Hooke joint blocks rotational movement of said drag link about said rack axis.

* * * * *